March 5, 1929.   C. G. LITTLEFIELD   1,704,617
GAME APPARATUS
Filed Aug. 22, 1927
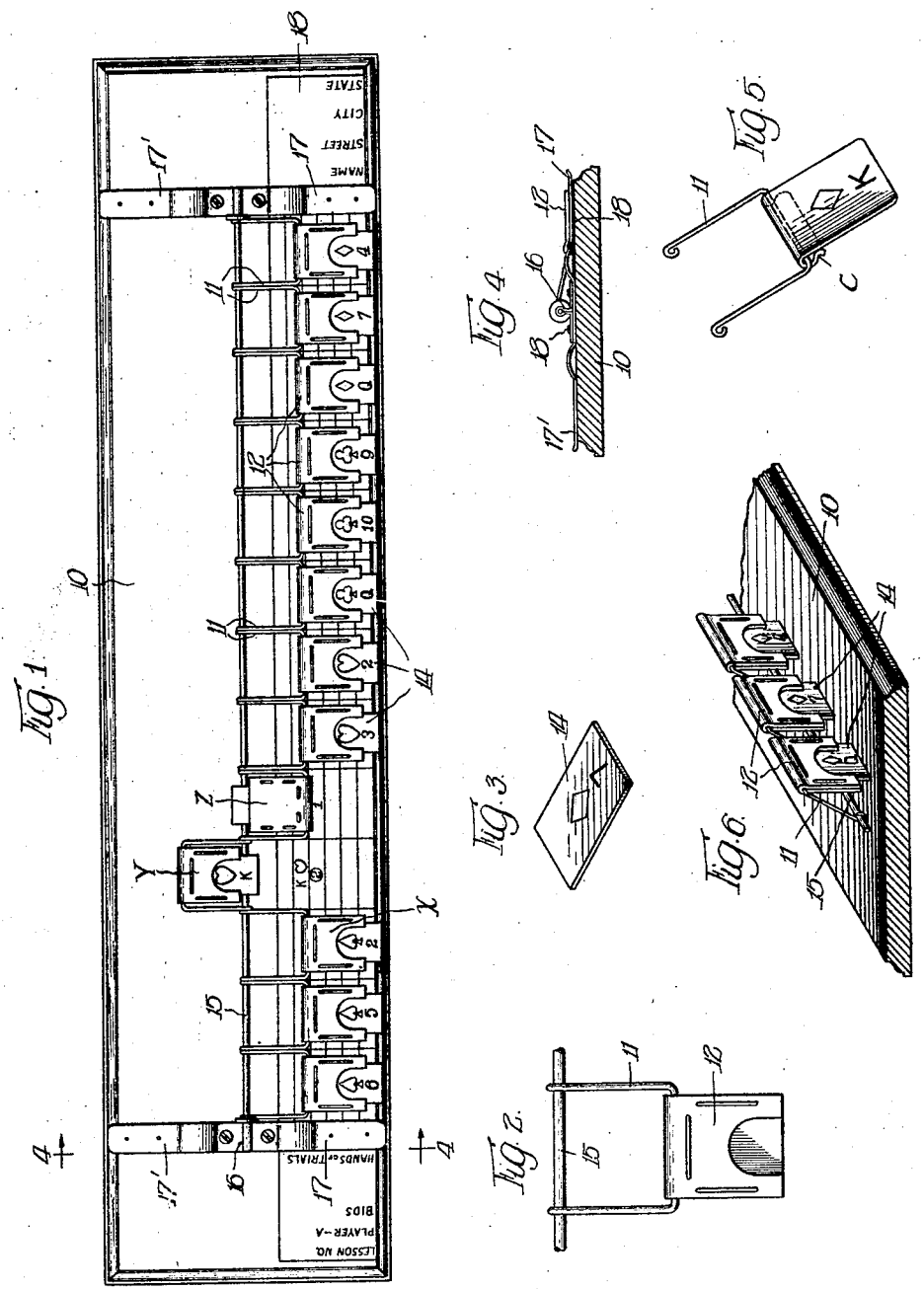
Inventor:
Calvin G. Littlefield, Patented Mar. 5, 1929.

1,704,617

UNITED STATES PATENT OFFICE.

CALVIN G. LITTLEFIELD, OF GLENCOE, ILLINOIS.

GAME APPARATUS.

Application filed August 22, 1927. Serial No. 214,528.

This invention relates to game apparatus of the sort described and claimed in my U. S. Patent No. 1,642,119 granted September 13, 1927. The apparatus is one adapted for the playing of various games, such as those customarily played with playing cards, and it is devised particularly for the purpose of affording a convenient means for the study of methods of play or working out of problems presented by various card combinations in various hands.

The general object of the invention is the provision of a device affording facilities for the comparison of different methods of play involving the playing of the cards in hands in different sequences.

Another object is the provision of a device which may be employed as a medium of instruction in the playing of different games, such as the game of whist.

Yet another object is the provision of a device for the uses indicated above, which accommodates the playing of hands involving any card combination possible in the game.

Another object is the provision of a device having the characteristics mentioned above and which is equipped and qualified to facilitate the keeping of accurate records or data indicative of the sequences in which the cards constituting a given hand are played, said record affording a convenient and instructive basis for comparison of the various methods of play.

Another object is the provision of an apparatus having the characteristics aforementioned in a form contributing to economy in production and facility and convenience in manipulation.

Other and further objects will be pointed out or indicated hereinafter, or will appear to one skilled in the art upon an understanding of the invention or its employment in use.

In the drawing forming a part of this specification, I illustrate one embodiment of the invention and various details thereof, but as these are presented for purpose of illustration only, it is to be understood that they are not to be given any interpretation calculated to limit the claims short of the true and most comprehensive scope of the invention in the art.

In said drawing,

Fig. 1 is a top view of a device embodying the invention;

Fig. 2 is a top view of a portion of one form of indicator;

Fig. 3 is a perspective view of another indicator portion;

Fig. 4 is a section on line 4—4 of Fig. 1;

Fig. 5 is a perspective view of another form of indicator; and

Fig. 6 is a perspective view illustrating one position in which the indicators may be arranged.

As is well known, various card games, such as auction bridge, offer great variety in the make-up of possible card combinations in hands, and also great variation in the sequences in which the cards of a hand may be played. For purposes of study or instruction or the working out of problems, it is desirable to make comparisons of the various methods of sequence in which the cards of a hand may be played, the object being, of course, to determine the method in which a hand may be played to the best advantage with a given distribution of cards among the several hands involved in the playing. The present invention provides a device whereby such comparisons may be made with facility, the operation of the device corresponding in essentials to the normal manipulations in the playing of a hand and affording facilities for the making of accurate records or data indicative of the play, such apparatus being operable by an individual or by a number of persons in such fashion as to afford a convenient means of study or instruction.

Referring to the illustrative embodiments shown in the drawing, let it be understood that the reference numeral 10 designates a suitable support, in the nature of a board, which is adapted to rest flat upon a table and serving as a support or mounting for a number of indicators. The indicators, in the form illustrated in Figs. 1, 2, 3 and 6, each comprise a link portion 11, leaf portion 12 and token portion 14. The leaf portion 12 is in the form of a pocket member having hinge mounting on the link portion 11, and the token portion 14 is adapted to be mounted on the leaf 12 by being slipped into the pocket. The several indicators are mounted in collateral relationship on a rod or wire 15, the ends of the link portions 11 being looped around the rod so that the indicators may swing thereon through a vertical arc. The ends of the rod 15 are retained in mountings 16 which rest on top of strips of metal, the end portions of which extend to form the spring clips 17, the mountings and strips being secured to the board by screws 18. The tokens 14 bear markings designative of the respective cards with which the game is played and when the indicators are in the position of the one marked X in Fig. 1, said markings are exposed. This position of the indicator will hereafter be referred to as the "hand" position. By swinging the link portion 11 of an indicator across the rod 15 and keeping the indicator marking up, the indicator is moved to the "played" position, which is that occupied by the indicator designated Y in Fig. 1. Then by swinging the link of an indicator back across the rod 15 and swinging the leaf portion to an inverted position, the indicator is moved to the "turned" position, which is that occupied by the indicator designated Z in Fig. 1. In these several positions, the indicators lie upon the board 10, the card markings being exposed in both the hand and played positions, but being concealed in the turned position.

The device as above described is designed to constitute one of a set, the set including as many as there are hands employed in the playing of the particular game under consideration; for example, for the game of auction bridge, four of the devices will constitute a set. If the game is being played by a number of persons, as for example, a player for each hand, it may be desirable that the card markings of each hand be concealed from the players having the other hands. This may be accomplished by placing the indicators in the position illustrated in Fig. 6, wherein their free ends rest upon the board and the card markings are visible from only one side of the board. From such position the indicators may be turned to the played position as desired.

Record sheets are provided for association with the indicators, one of said record sheets being illustrated at 18. This record sheet is in the form of a strip of paper or the like and when inserted under the spring clips 17, is retained flat upon the board 10 in a position underlying the indicators when they are in their hand position. This record sheet is ruled off into columns parallel with the indicators, the columns being allotted to respective indicators. The record strip may also be ruled longitudinally to provide a plurality of entry spaces. In the column allocated to each indicator is marked the card designation borne by the indicator, as shown by way of example in the column associated with the indicator Y in Fig. 1.

The token portions, as characterized by their markings, constitute a full deck for the game which is to be played. They may be distributed to the respective hands by a blind deal, or, in instances for study or instruction, in accordance with a prearranged distribution. Such prearranged hands may have the card designations printed on the record sheets in accordance with the predetermined distribution and serve as a guide for the proper assortment of the token portions into the respective hands. In other instances, the card designations may be marked on the record sheets by the player or players. It is desirable that the location of the card designations on the record strip be in such position that they are covered by the indicators when the latter are in their turned position, as indicated by the indicator Z in Fig. 1. In the use of the device, the play proceeds in the customary fashion of the game being played, the respective indicators being moved from the hand position to the played position incident to the playing of the respective tricks, and then moved to the turned position at the conclusion of the trick. Thereupon, for making the record, the entry is made in the entry space allocated to the indicator, to indicate the trick in which the indicator was played. For example, the number 1 in the entry space under the indicator Z indicates that that indicator was played in the first trick, while the number 2 in the entry space allocated to the indicator Y indicates that that indicator was played in the second trick, said number being circumscribed by a circle to indicate that the trick was taken by the card to which the entry pertains, namely the king of hearts. After a hand has been played through in this fashion, the indicators may all be restored to the hand position, and the play repeated, as for the purpose of determining what different results would be obtained by playing the cards in a different sequence. For such second trial, appropriate entries are made on the record sheet, as may also be the case with a third or fourth trial. As a result, therefore, when the various trials have been finished, the record sheets will contain definite data as to the several sequences of play in the several trials and the number of tricks taken with the respective hands or the respective cards, from which an informative comparison may be made for determining the most advantageous sequence of play. The spring clips 17' are adapted for the holding of additional record strips in association with the indicators so that entries thereon may be made in similar fashion for additional trials.

In Fig. 5 is illustrated an alternate form of indicator, wherein the token portion and leaf portion are combined as an element detachable from the link portion 11, said element having a resilient clip portion $c$ which may be sprung onto or off of the link portion to permit the interchanging of the elements in accordance with different distributions.

What I claim is:

1. Game apparatus comprising the combination of a board, a rod, an indicator mounted on the rod for swinging movement to three different positions, mountings securing the rod to the board and retaining means held by the mountings for holding a record sheet in association with the indicators.

2. Game apparatus comprising the combination of a board, a rod mounted on same, links hinged on the rod in collateral association, leaf portions hinged on respective links and tokens carried by the leaf portions with their tops toward the links.

3. In game apparatus, the combination of a board, a rod, indicators having swinging movement on the rod in collateral relationship, mountings securing the rod to the board, and spring clips retained by the mountings in cooperation with the board.

In testimony whereof I have hereunto subscribed my name.

CALVIN G. LITTLEFIELD.